3,031,422
PREPARATION OF ORGANIC PLASTIC
MATERIALS
Karl W. Posnansky, Stamford, Conn., assignor to The
Stamford Rubber Supply Company, Stamford, Conn.
No Drawing. Filed Aug. 18, 1959, Ser. No. 834,421
20 Claims. (Cl. 260—23)

This invention relates to the preparation of new, uniform organic plastic materials having several of the following properties: good physical strength, hard surface characteristics, superior chemical and solvent resistance and high dielectric strength. The invention is also directed to organic plastic materials and compositions made from chemically combined oils and their method of preparation. More specifically, this invention relates to compounds made from polyisocyanates and hydroxyl group-containing, chemically combined oils made from hydroxyl-free unsaturated organic compounds and hydroxyl-containing aliphatic polyhydric alcohol esters of straight chain unsaturated higher fatty acids.

Polyisocyanates have been extensively employed heretofore as reactants and modifiers for many various organic compounds including triglycerides, alkyd resins and aliphatic polyhydric alcohols. For example, United States Patent Number 2,609,349 describes the preparation of polymers from large molar proportions of styrene and minor molar proportions of castor oil and a diisocyanate by reacting simultaneusly styrene, castor oil, a diisocyanate and a small amount of a peroxide catalyst, or by first reacting the castor oil and diisocyanate and then adding large proportions of styrene followed by addition of more diisocyanate and peroxide catalyst. The processes described in the abovementioned patent can be used only with styrene, other unsaturated monomers, and particularly high molecular compounds, such as polymers, resulting in entirely different products. The method described herein is entirely distinct from the processes of the above-mentioned patent in that castor oil is first co-polymerized with an unsaturated organic compound in the presence of a peroxide and then mixed with a polyisocyanate. The process of this invention enables the use of high molecular weight compounds, which in fact are preferable as starting materials to provide valuable products. In addition, the method of this invention does not require high molar amounts of unsaturated compounds as starting materials with castor oil in order to provide valuable products.

Castor oil and coconut oil have been heated in the presence of litharge, mixed wtih phenol-modified ester gum and heated, followed by dilution and the addition of a diisocyanate as disclosed in United States Patent Number 2,358,475. Materials thus formed are dependent on oxygen from the air for solidification (air-drying) and consequently will yield solids only if exposed to air in thin layers. Even in this form they will dry slower and have poorer physical properties, particularly strength properties, than the products of this invention.

An object of this invention is to provide organic plastic materials which are uniform materials having rubber-like, resinous or plastic-like qualities, and which are useful in making molded articles, films, sheets, foamed articles, coating compositions, laminating compositions, adhesives and the like.

Another object is to provide useful organic plastic materials which are prepared from naturally occurring and by-product materials and have advantageous properties.

Another object is to provide useful organic plastic materials which are superior in strength, and other desirable physical properties, to compositions made from similar starting materials.

Still another object is to provide useful organic plastic materials which are uniform materials, the component parts of which are resistant to extraction by solvents, or exudation by the lapse of time.

Still another object of this invention is the provision of a method wherein the properties of products formed thereby can be more readily controlled than heretofore known processes by the selection of types and proportions of starting materials.

Other objects and advantages of this invention are apparent in the following detailed description.

Broadly, the invention involves a process comprising the steps of reacting an unsaturated, higher organic compound which is substantially free of hydroxyl groups chemically combined in the molecules thereof and a hydroxyl-containing aliphatic polyhydric alcohol ester of a straight chain, unsaturated, higher fatty acid with an organic peroxide to obtain a co-polymerizate and then mixing the resulting material with an organic polyisocyanate.

This invention is based on the discovery that products prepared by the reaction of the non-hydroxyl, unsaturated organic compounds and the hydroxyl-containing, unsaturated esters in the presence of an organic peroxide upon reaction with organic polyisocyanates provide products with much improved properties over materials made by reacting polyisocyanates with simple mixtures of the non-hydroxyl, unsaturated organic compound and the hydroxyl-containing, unsaturated esters, or even those materials made by reacting polyisocyanates with non-hydroxyl, unsaturated organic compounds which have been heat-polymerized with the hydroxyl-containing, unsaturated esters, in the presence or absence of oxygen and/or catalysts other than organic peroxides. If the two or more starting materials are treated with peroxide separately and then mixed with each other and a polyisocyanate, an inferior, especially less uniform, product results. It has been further discovered that by first reacting the non-hydroxyl, unsaturated organic compound with the hydroxyl-containing unsaturated esters in the presence of organic peroxides prior to reaction with the polyisocyanate that a wide range of non-hydroxyl, unsaturated organic compounds can be employed.

The unsaturated starting materials, i.e., the non-hydroxyl, unsaturated organic compound and the hydroxyl-containing, unsaturated ester, are mixed with an organic peroxide and reacted until a material of desired viscosity has been obtained. It is advantageous to obtain as high a viscosity as possible without gelling since a liquid material is easily handled and readily mixed with the polyisocyanate in the final reaction. Gelled materials, however, can be used if solubilized with the polyisocyanate by any suitable means. The relative proportions of the non-hydroxyl, unsaturated organic compound and the hydroxyl-containing, unsaturated ester are not narrowly critical. For preparing hard, tough products, predominant proportions of the hydroxyl-containing ester are employed, and when softer, more flexible products are desired, lower proportions of the hydroxyl-containing ester are used. In general, parts by weight ratios of the non-hydroxyl, unsaturated organic compound to the hydroxyl-containing, unsaturated ester in the range of 10 to 300 or more, based on 100 parts by weight of hydroxyl-containing compound, result in useful products. Of particular importance is the discovery that valuable products are obtained even when large proportions of the non-hydroxyl, unsaturated organic compound are used.

The amount of organic peroxide employed depends on the specific characteristics of the unsaturated starting materials employed, the active oxygen content and reactivity of the specific peroxide. For example, 12% of tertiary butyl peroxide (active oxygen of about 8.07%)

based on the weight of unsaturated starting materials provides approximately the same results as 16% of dicumyl peroxide (active oxygen about 5.7%) based on the weight of starting materials. The quantity of peroxide employed is sufficient to provide a suitable viscosity and, if the viscosity increase during the progress of the reaction is not enough, or is not sufficiently rapid, additional peroxide is added. In general, amounts of peroxide in the range of 5% to 25% based on the weight of unsaturated starting materials are adequate. Small amounts of low molecular weight unsaturated compounds, e.g., styrene, methyl methacrylate and the like, can be used in the mixtures of unsaturated starting materials as aids to chemically combining said starting materials.

The temperature at which reaction of the unsaturated starting materials is conducted is preferably the lowest consistent with an adequate rate of reaction which is indicated by exothermic heat and/or rate of viscosity build up. The lowest practical temperature is that at which the half life of the peroxide employed provides a practical time for reaction to the desired viscosity. Temperatures in the range of about 120° C. to 175° C., in general, are adequate to provide a fast enough rate of reaction but not so high as to encourage undesirable side reactions, e.g., dehydrogenation. The reaction is usually exothermic and it is advantageous to add the peroxide in increments with cooling prior to each incremental addition. Excessively high temperatures are avoided and the reaction is carried out more easily.

The intermediate materials thus obtained, undiluted or diluted with solvents, are then mixed with the organic polyisocyanates. The amount of polyisocyanate employed is generally that amount providing approximately one isocyanate group for each hydroxyl group of the intermediate materials. Specifically, the amount of polyisocyanate used depends on the specific characteristics desired for the product, lower amounts providing compositions which set faster to softer, less strong products, and higher amounts providing compositions with long shelf-lives, setting by heating, by the use of a catalyst, in certain cases on exposure to air or by aging in the absence of air, to harder, stronger products. Exposure to air is not necessary for setting, though in the case of thin coatings both moisture or oxygen from air will act as hardening agents (moisture acting on the isocyanate groups and oxygen on residual unsaturation). A range of 0.5 to 3 isocyanate groups per hydroxyl group of the intermediate material are adequate for providing products having a wide range of properties.

The polyisocyanate can be added to the intermediate material alone, or as mixtures of polyisocyanates, or in admixture with solvents, modifiers, foaming compounds, setting catalysts, e.g., lead or cobalt naphthenates, organic tin compounds, amines or other substances for accelerating the formation of polyurethanes, or other compounds for providing special effects. Heat can be employed in place of, or in addition to, setting catalysts for accelerating the setting of polyisocyanate-intermediate material compositions. Setting of the compositions takes place at room, or lower, temperatures, however, although requiring a somewhat longer setting time.

The compositions are used to make molded articles and are most conveniently employed in such instances without solvents. They are also used to make films, coatings, adhesives and laminating resins in which instances they can be, or need not be, employed with a solvent.

Unsaturated, higher organic compounds as one unsaturated starting material of this invention are the liquid, unsaturated organic compounds substantially free of chemically combined hydroxyl groups and preferably having a molecular weight of at least 200. Included as compounds of this type are esters of unsaturated higher fatty acids, e.g., linseed oil, tall oil, rapeseed oil, soy bean oil and the like, rosin and rosin esters, higher molecular oil and the like, rosin and rosin esters, higher molecular weight unsaturated hydrocarbons, e.g., higher molecular weight unsaturated petroleum derivatives, Ethyl Polymer oil, and the like, and conjugated diolefin polymers and copolymers, e.g., polybutadiene, butadiene-acrylonitrile copolymers and the like.

Illustrative of the hydroxyl-containing aliphatic polyhydric alcohol esters of unsaturated, higher fatty acids include castor oil, diethylene glycol diricinoleate, triethylene glycol diricinoleate, pentaerythritol tetraricinoleate, grape oil, hydroxylated soy bean and fish oils, mono- and diglycerides of tall oil, transesterification products of linseed oil and polyhydric alcohols, and the like.

Organic peroxides employed in this invention include the well-known vinyl polymerization catalysts, especially those comprising alkyl and/or aryl groups interconnected by peroxy groups —$O_2$—. Illustrative organic peroxides are benzoyl peroxide, dicumyl peroxide, cumene hydroperoxide, diisopropylbenzene peroxide, para-menthane peroxide, tertiary-butyl perbenzoate, 2,5-dimethylhexane-2,5-dihydroperoxide and the like.

Organic polyisocyanates generally include the aliphatic and aromatic polyisocyanates, e.g., alkylene diisocyanates, arylene diisocyanates, m-tolylene diisocyanate, diethylmethane diisocyanate, 3,3-dimethyl-4,4-diphenylene diisocyanate, 3,3-dimethoxy-4,4-diphenylene diisocyanate, 2,3-dimethyltetramethylene diisocyanate, 2 chlorotrimethylene diisocyanate, trimethyl methane triisocyanate, dianisidine diisocyanate, Carwin Company's PAPI (polaryl polyisocyanate), DuPont's Hylene MP (a bisphenol adduct of methylene-bis-4-phenyl isocyanate), Mobay's Modur CB-60 (a solution of the reaction product of trimethylol propane and tolylene diisocyanate), Mobay's Mondur PG-50 and 56 (a polyether-isocyanate prepolymer containing free isocyanate groups and reacting as a diisocyanate), and the like.

The following examples are presented. In the examples, as well as elsewhere in this specification, all percentages and parts unless otherwise designated are based on weight and temperatures are given on the Fahrenheit scale.

*Example I*

100 parts of castor oil and 50 parts of raw linseed oil were mixed together. 5 parts benzoyl peroxide were added and the mixture gradually heated under stirring to 240° F. At this temperature a vigorous reaction, accompanied by foaming and also by a rise in temperature, occurred which, however, quickly subsided. Heating was continued to approximately 300° F. until most of the peroxide had reacted or been decomposed, as indicated by cessation of foaming.

The temperature of the mixture was then reduced to between 190° and 200° F., an additional 5 parts benzoyl peroxide added and the mixture reheated in the same way as described above. This procedure was repeated twice more until a total of 20 parts of benzoyl peroxide, representing 13–14% by weight, had been added to the starting oil mixture. After heating was discontinued and the mixture allowed to cool back to room temperature, its viscosity was found to be substantially increased. The viscosity of the oil mixture prior to the peroxide treatment, measured by a Gardner Bubble Viscometer, was between I and J while that of the reaction product is close to Y on the same scale. The total treatment was completed in 4–5 hours.

The purpose of adding the peroxide in increments at a reduced temperature was to retain better control of the reaction. In principle, the addition can be made all at once or be split into any number of increments, depending on the size of the batch and the type of controlling equipment used.

(A) 100 parts of the above reaction product were mixed with 15–17 parts of tolylene diisocyanate and poured into a mold and allowed to stand at room temperature. After 5 hours at room temperature, the mixture had solidified sufficiently to be removed from the mold. It was a soft, light yellow, clear, rubbery product of limited strength but excellent elasticity. The initial hardness was approximately 10 on a Shore A durometer, but the product further hardened on aging during the first few days after its preparation to reach a final Shore A durometer reading of 49. Setting and hardening can be accelerated by heating and/or the addition of catalysts. (*Note.*—17.1 parts by weight of tolylene diisocyanate represents a 1:1 ratio of NCO to available hydroxyl as calculated from the castor oil content of the co-oxidate, based on the accepted equivalent of 25.5 parts of the diisocyanate per 100 parts castor oil. Fifteen parts by weight of the diisocyanate were sufficient to yield the solid product described above. Compositions containing proportions of the diisocyanate higher than 17.1 parts solidify slower but give harder final products.)

(B) 100 parts of the above reaction product were mixed with 70 parts of Mobay Chemical Company's Mondur PG–56, a polyether-isocyanate-prepolymer containing free isocyanate groups and reacting as a high molecular diisocyanate with a low (10–10.5 weight percent) NCO content, and poured into a mold or other cavity. After solidification, at room temperature, the resulting product was similar to that obtained under A, except that it was somewhat softer. Final Shore A durometer hardness was 44.

(C) 100 parts of the above reaction product were mixed with 25 parts of tolylene diisocyanate and poured on a glass plate. After being heated for 12 hours to 195° F. to speed up the reaction (polyurethane formation) a solid, clear, fairly strong, rubbery film of light yellow color resulted.

Lower proportions of tolylene diisocyanate, such as 15 or 20 parts per 100 parts of the reaction product, also yielded solid films of similar appearance, except that they were somewhat softer and not as strong. Conversely, higher proportions produced harder and stronger films or coatings.

However, the setting or solidification with lower proportions of diisocyanate as a rule proceeds faster, even at room temperature, while higher proportions, representing an excess of isocyanate (NCO) groups over available hydroxyl groups mostly require either a longer "setting" or exposure time, or require moderate heating and/or accelerations such as exemplified in the following.

100 parts of the reaction product were diluted with 100 parts of xylene and mixed with 36 parts of tolylene diisocyanate (representing an excess of 100%–110% diisocyanate over available hydroxyl groups). To promote the initial reaction, a short heating period, approximately 1 hour at 120–140° F. is desirable, though not required.

The resulting isocyanate adduct (in which, on the average, only one of the two reactive groups of the diisocyanate is reacted) was a stable solution which does not gel on prolonged storage. After being applied as a thin layer, the coating dried to a tough, hard film on air exposure (with an assist from the moisture of the air), or on moderate heating. The reaction can also be speeded by the addition of any of the various catalysts known in the art, such as a small percentage of an amine, as methyl diethanolamine, or of metallic compounds, such as cobalt and lead naphthenate.

When the same oil mixture is reacted with tolylene diisocyanate without the preceding peroxide treatment, a non-uniform product containing liquid linseed oil results, due to the fact that only the hydroxy-oil (castor oil) reacts with the isocyanate.

Example II 100 parts castor oil and 50 parts raw linseed were subjected to the peroxide treatment outlined in Example I, except that 24 parts of dicumyl peroxide (16% on the total oil mixture) were used instead of benzoyl peroxide. In this case, the temperatures can be somewhat increased, ranging from 240° F. at the time of the addition to 340° F. at the highest point. A similar increase the viscosity of the mixture as described in Example I resulted.

100 parts of the reaction product were diluted with 25 parts of toluene for easier application and 20 parts of tolylene diisocyanate were added. After spreading the mixture in a thin layer it dried and solidified to a clear, practically water white, flexible and elastic film. The solidification can be speeded by subjecting it to a moderate heat treatment as described in Example I, and/or by catalysts.

Example III

The same starting oil mixture as in Example II was treated with 20 parts of cumene hydroperoxide (approximately 13.3% on total oil mixture) added in three increments. In this case, the temperature at the time of the addition of the peroxide can be as high as 340° F. and can be raised subsequently to 440° F. and kept there for approximately 1 hour following each addition.

The resulting product had a viscosity of approximately V on the Gardner scale.

100 parts of this reaction product mixed with 20 parts of tolylene diisocyanate yielded a clear yellow coating or film after 2 days drying at room temperature which was further hardened by baking it 2 hours at 220° F.

Another 100 parts of the reaction product were mixed with 50 parts of "Hylene MP" (a bis-phenol adduct of methylene bis [4 phenyl isocyanate] from the DuPont de Nemours Co.) representing a phenol-blocked diisocyanate. To remove the blocking phenol group and activate the isocyanate, this mixture has to be heated to a temperature of 280° F. After 4 hours at this temperature, a clear soft, fairly rubbery, solid film or product was formed.

Example IV 31.5 parts of diisopropyl benzene hydroperoxide, added in three increments, were used in the same oil mixture described in the previous examples, making a total of 21% of this peroxide on the total mixture. Temperatures were kept at approximately 200° F. during each addition and raised to approximately 360° F. for 1 hour after each addition. Some foaming was observed at approximately 325° F.

Gardner viscosity at the end of the peroxide treatment was approximately U.

100 parts of the peroxide-treated product were reacted with 20 parts of tolylene diisocyanate and gave, under similar conditions as described previously, a clear, slightly yellow, rubbery film or coating, somewhat softer and somewhat less strong than the ones obtained in the earlier examples.

Example V 28 parts of para-methane hydroperoxide (19% on total oil mixture) were used under conditions identical to those described in Example IV on an identical mixture of the same oils. The viscosity of the resulting product was read as V at room temperature.

100 parts of the peroxide-treated product was reacted with 20 parts of tolylene diisocyanate as described in Example IV. The isocyanate reaction product thus obtained was similar to that of Example IV.

Example VI 100 parts castor oil and 50 parts crude soy bean oil were subjected to the same treatment as described in the previous examples, except that 75 parts of Di-Cup 40–C were added in three increments at temperatures of 255° F. at the time of the addition of the peroxide to 300° F. at the highest point over a period of 2 hours. Di-Cup 40–C, a mixture containing 40% dicumyl peroxide and 60% calcium carbonate, is manufactured by the Hercules Powder Company.

100 parts of the resulting product were reacted with 14 parts of tolylene diisocyanate and the final reaction product was opaque, solid and rubbery.

A mixture containing amounts of castor oil, soya bean oil and calcium carbonate to correspond exactly in ingredients to the one obtained from the above reaction, but not treated with peroxide, yields the same type of wet, oily product described at the end of Example I when reacted with tolylene diisocyanate.

Example VII 360 parts of diethyleneglycol diricinoleate and 240 parts of raw linseed oil are mixed with 72 parts of t-butyl perbenzoate and the mixture was gradually heated to 340° F. and heated under stirring for 3 hours at this temperature. In this case the total peroxide was added in the beginning, without the use of the increment method. The escape of a white sublimate (benzoic acid) was noticed during the reaction.

100 parts of the above reaction product were diluted with 50 parts of xylene, and 20 parts of tolylene diisocyanate were added. The resulting reaction product was a soft, clear, light yellow, rubbery material with a slightly tacky surface.

Example VIII 400 parts of castor oil were heated to approximately 250° F. and 200 parts of glyceryl rosin ester (Hercules Powder Company's Estergum 8L) dissolved therein. Then 96 parts of dicumyl peroxide were added to this mixture and the temperature gradually raised to between 300–320° F. At this point the reaction became strongly exothermic and the temperature climbed, without further heating, to approximately 419° F. for a short period until the reaction had passed its peak. (The reaction can be better controlled by adding the peroxide in increments as described in the previous examples.) Heating of the mixture was continued for an additional 2 to 3 hours at 340° F. Upon cooling, a very viscous, resinous, product was obtained.

100 parts of the reaction product were diluted with 25 parts of xylene, and 20 parts of tolylene diisocyanate were stirred into it. After this addition, it was applied as a coating or dipping compound. After approximately 12 hours drying at room temperature, to allow for the evaporation of the solvent, the coated object was subjected, in a low temperature heating oven, for 2½ hours at a temperature of approximately 158° F. to assure complete evaporation of residual solvent and to speed hardening. Room temperature drying over a longer period with or without one of the catalysts mentioned in Example I will work equally well. The resulting coating had a hard, fairly scratch resistant surface, but is still very flexible and elastic.

When 100 parts of the same dicumyl peroxide reaction product were diluted with 25 parts of methylisobutyl ketone and reacted with 65 parts of Mondur CB-60 which is a 60% solvent solution of a non-toxic, non-irritating triisocyanate formed by reacting tolylene diisocyanate with a tri-functional polyol (e.g., trimethylol propane), a very hard plastic-like but still flexible coating or film resulted.

Example IX 100 parts of castor oil and 100 of glycerol ester of refined tall oil (containing approximately 60 fatty acids and 40 rosin acids in the ester) were mixed together and treated at elevated temperatures with a total of 32 parts of dicumyl peroxide added in 2 increments. The temperature was held to approximately 245° F. during the time of addition of the peroxide, gradually increased to approximately 340° F. and was held at that temperature for approximately 1 hour after each addition, the whole reaction being completed in approximately 3 hours.

(A) 100 parts of the reaction product were diluted with 50 parts of xylene and mixed with 20 parts of tolylene diisocyanate. Upon application as a thin layer, after a sufficient period to allow for the evaporation of the solvent and completion of the reaction with the isocyanate, (with or without application of heat) a uniform clear, solid film or coating was obtained.

(B) 100 parts of the same reaction product were mixed with 30.4 parts of diphenyl methane 4,4'-diisocyanate, and dissolved in 50 parts of warm toluene. It is best to warm the whole mixture during the addition of the diisocyanate to allow thorough distribution of the diisocyanate. After application and evaporation of the solvent, the film or coating may be subjected to a short heating period at 190° F. to assure complete reaction. The resulting film or coating is harder and stronger than that obtained with the approximately equivalent amount of tolylene disocyanate used in A.

(C) Instead of the 30.4 parts of diphenylmethane diisocyanate, 29 parts of 3,3' ditolylene diisocyanate per 100 parts of the peroxide reaction product were used in the same way described in B. This yields a somewhat opaque but otherwise similar final reaction product.

Example X 360 parts of castor oil and 240 Panopol 2–C (an unsaturated hydrocarbon petroleum derivative from the Pan-American Refining Co.) were mixed with 72 parts of t-butyl perbenzoate and heated with stirring to approximately 390° F. At this point, the exothermic reaction caused the temperature to rise to approximately 401° F., accompanied by strong foaming. (This can be avoided by the use of the increment method described in the earlier examples.) After the violent reaction had subsided, heating was continued for another 2 hours at approximately 320° F.

100 parts of the resulting reaction product were diluted with 25 parts xylene and mixed with 20 parts of tolylene diisocyanate. This mixture was then applied as described in the previous example, yielding a stretchable, soft, solid, slightly tacky product, suitable for adhesive or laminating purposes as well as other uses.

Example XI

In this example castor oil as the hydroxyl-containing oil and a liquid butadiene-acrylonitrile polymer (Hycar 1312 from B. F. Goodrich Co.) were used as starting materials. Since the liquid polymer was both much higher in viscosity and also reacts considerably faster, either bodied (blown) castor oil should be used, or the raw castor oil subjected to a partial peroxide reaction by itself before the butadiene-acrylonitrile polymer is added. The latter alternative was used in this example.

400 parts of castor oil were mixed with 15 parts of t-butyl perbenzoate and heated to between 320–330° F. After a short period at this temperature the mixture was cooled to approximately 210° F., another 15 parts of t-butyl perbenzoate added and the mixture reheated. The cooling, peroxide addition and reheating process was repeated once more, so that a total of 45 parts of t-butyl perbenzoate had been reacted with the castor oil itself. Foaming, indicating a vigorous reaction, was observed after each addition, when the mixture reached approximately 295° F. A cooled sample of the mixture showed a substantial increase in viscosity over the starting oil.

200 parts of Hycar 1312 were then added to this prebodied oil and distributed therein. An additional 15 parts of t-butyl perbenzoate was added and the temperature gradually raised to approximately 340° F. After cooling, the addition and heating procedure was repeated once more and can even be repeated again provided that the viscosity of the mixture has not become excessive. A total of 30–40 parts peroxide were added in this second addition step.

After the final addition and heating period, the mixture was cooled to approximately 260° F. and diluted by the addition of 200 parts of xylene to assure a workable viscosity at room temperature. The mixture was then strained through cheesecloth to remove any solid gel particles which may have formed.

100 parts of the strained solution were mixed with 15 parts of tolylene diisocyanate and applied as a coating, or spread on a glass plate. A strong, rubbery elastic coating or film resulted after evaporation of the solvent and completion of the urethane reaction.

Example XII 100 parts castor oil and 50 parts rapeseed oil were co-oxidized according to the increment method with 17 parts of 2,5-dimethylhexane-2,5-dihydroperoxide added in four equal increments. Each addition was made at or below 320° F. and, after each addition, the temperature gradually increased to 420° F. A vigorous reaction, indicated by foaming, occurred at approximately 400° F.

After cooling to room temperature, 100 parts of the mixture were reacted with 20 parts of tolylene diisocyanate. The resulting reaction product was a uniform, soft, rubbery material.

Example XIII 300 parts of diethylene glycol ester of rosin (Flexalyn from Hercules Powder Co.) and 300 parts of triethylene glycol ricinoleate were blended together at slightly elevated temperatures (180–200° F.) to facilitate mixing. 25 parts of t-butyl perbenzoate were added thereto and the stirred mixture, over a period of 45–60 minutes, gradually heated to 350° F. The mixture was then cooled to approximately 200° F. and the addition of 25 parts of the peroxide with subsequent reheating was repeated twice, until a total of 75 parts t-butyl perbenzoate, representing 12.5% of the starting material by weight, had been reacted therewith.

100 parts of the resulting product were then diluted with 20 parts of toluene and reacted with 20 parts of tolylene diisocyanate.

After the solvent had evaporated and the reaction completed, a solid, hard, resinous material resulted.

Example XIV 300 parts of pentaerythritol tetra-ricinoleate (Flexricin 19 from the Baker Castor Oil Co.) were mixed with 300 parts of Ethyl Polymer oil (a hydrocarbon drying oil made by the Ethyl Corp.)

This mixture was reacted with 96 parts (16% by weight) of technical dicumyl peroxide (Di-Cup from the Hercules Powder Co.) added in three increments at temperatures ranging between 240° F. and 360° F. in the way described in the foregoing examples.

100 parts of the resulting reaction product were mixed with 15 parts of tolylene diisocyanate and poured into a mold and cured for 8–10 hours at approximately 200° F. On removal from the mold, a solid, strong, rubbery, elastic molded article was obtained.

Another 100 parts were mixed and molded in the same way, except that 10 parts of polyaryl polyisocyanate (PAPI from The Carwin Co.) were used instead of tolylene diisocyanate, yielding a similar elastic coating.

Example XV 100 parts of castor oil and 50 parts of linseed oil were mixed together and cooked at a temperature of approximately 520° F. for 5 hours. Sufficient contact with oxygen from the air was provided by either vigorous stirring and/or blowing of air through the mixture during the heating period. The viscosity of the resulting product, after cooling was X on the Gardner scale.

100 parts of the resulting viscous oil were mixed with 20 parts of tolylene diisocyanate and poured on a glass plate. A soft coherent gel was formed after approximately 15 hours at room temperature, which further hardens on prolonged aging or by heating for 10–12 hours at approximately 200° F. The resulting uniform yellow rubbery film was, however, much less strong and in general had much poorer physical qualities than that obtained from the same raw materials reacted in the same proportions in the presence of peroxides as described in Examples I–V.

Example XVI 100 parts of castor oil and 50 parts of linseed oil were heated together, with stirring, in the presence of 1 part of Boron trifluoride ether complex which acted as a promotor for the copolymerization of the two oils, for a period of 6 hours at a temperature between 360–380° F.

After cooling, 100 parts of the resulting material were reacted with 20 parts of tolylene diisocyanate. The resulting reaction product was a soft, somewhat tacky, light-colored gel of very limited strength. In general, this reaction product was much poorer in physical characteristics, e.g., strength, hardness, tackiness, etc., than the products obtained from the same starting materials reacted in the same quantities in the presence of peroxides as described in Examples I–V.

Example XVII

In this example the same starting oils and procedure as in Example XVI were used, except that 3 parts (2% by weight of the oil mixture) of quinone dioxime were used as a catalyst or promoter.

The resulting tolylene isocyanate reaction product is black in color, soft, rubbery and of limited tensile strength. In general, this reaction product was much poorer in physical characteristics, e.g., strength, hardness, tackiness, etc., than the products obtained from the same starting materials reacted in the same proportions in the presence of peroxides as described in Examples I–V.

Example XVIII

The same starting oils and procedure described in Example XVI were used, except that .6 part of lead naphthenate (containing 24% lead) and 1.25 parts of cobalt naphthenate in solution (containing 6% of cobalt) were used as catalyst.

The temperature over the 6-hour cook was kept between 320 and 330° F.

The isocyanate reaction product obtained by reacting the material thus obtained with 20% of its weight of tolylene diisocyanate was brown in color but otherwise similar to the ones obtained from Example XVI.

What is claimed is:

1. Method of preparing an organic plastic-forming composition which comprises the steps of, reacting an aliphatically unsaturated organic compound free of hydroxyl groups chemically combined therewith and a hydroxyl-containing aliphatic polyhydric alcohol ester of a straight chain unsaturated higher fatty acid, said unsaturated organic compound being polymerizable with said ester, in the presence of an organic peroxide in an amount of at least about 5 weight percent of the total weight of said unsaturated organic compound and said ester and mixing the resulting material with an organic polyisocyanate having a plurality of reactive isocyanate groups per molecule.

2. Method of preparing an organic plastic-forming composition which comprises the steps of, reacting an aliphatically unsaturated organic compound free of hydroxyl groups chemically combined therewith and having a molecular weight of at least 200, and an aliphatic polyhydric alcohol ester of ricinoleic acid, said unsaturated organic compound being polymerizable with said ester, in the presence of an organic peroxide and mixing the resulting material with an organic polyisocyanate having a plurality of reactive isocyanate groups per molecule.

3. The method claimed in claim 2 wherein the organic peroxide is benzoyl peroxide.

4. The method claimed in claim 2 wherein the organic peroxide is dicumyl peroxide.

5. The method claimed in claim 2 wherein the organic peroxide is cumene hydroperoxide.

6. The method claimed in claim 2 wherein the organic peroxide is diisopropyl benzene hydroperoxide.

7. The method claimed in claim 2 wherein the organic peroxide is para-menthane hydroperoxide.

8. Method of preparing an organic plastic-forming composition which comprises the steps of, reacting an aliphatically unsaturated organic compound free of hydroxyl groups chemically combined therewith and having a molecular weight of at least 200, and castor oil, said unsaturated organic compound being polymerizable with said castor oil, in the presence of an organic peroxide and mixing the resulting material with an organic polyisocyanate having a plurality of reactive isocyanate groups per molecule and selected from the class consisting of aliphatic and aromatic isocyanates.

9. The method claimed in claim 8 wherein the unsaturated organic compound is linseed oil.

10. The method claimed in claim 8 wherein the unsaturated organic compound is soy bean oil.

11. The method claimed in claim 8 wherein the unsaturated organic compound is rapeseed oil.

12. The method claimed in claim 8 wherein the unsaturated organic compound is an unsaturated hydrocarbon petroleum derivative.

13. The method claimed in claim 8 wherein the unsaturated organic compound is a mixture of linseed oil and styrene.

14. The method claimed in claim 8 wherein the organic peroxide is benzoyl peroxide.

15. The method claimed in claim 8 wherein the organic peroxide is dicumyl peroxide.

16. The composition made by the method claimed in claim 1.

17. The composition made by the method claimed in claim 8.

18. The composition made by the method claimed in claim 9.

19. The composition made by the method claimed in claim 10.

20. The composition made by the method claimed in claim 12.

References Cited in the file of this patent

UNITED STATES PATENTS

| | | |
|---|---|---|
| 2,194,988 | Schulein | Mar. 26, 1940 |
| 2,609,349 | Cass | Sept. 2, 1952 |